US011920558B2

(12) United States Patent
Söderin et al.

(10) Patent No.: US 11,920,558 B2
(45) Date of Patent: Mar. 5, 2024

(54) ROTOR BLADE AND METHOD FOR ASSEMBLY OF A ROTOR BLADE (71) Applicant: MODVION AB, Hisings Backa (SE)

(72) Inventors: Geir Söderin, Gothenburg (SE); David Olivegren, Gothenburg (SE); Erik Dölerud, Gothenburg (SE)

(73) Assignee: MODVION AB, Hisings Backa (SE)

( * ) Notice: Subject to any disclaimer, the term of this patent is extended or adjusted under 35 U.S.C. 154(b) by 0 days.

(21) Appl. No.: 18/027,877

(22) PCT Filed: Sep. 24, 2021

(86) PCT No.: PCT/SE2021/050931
§ 371 (c)(1),
(2) Date: Mar. 31, 2023

(87) PCT Pub. No.: WO2022/066090
PCT Pub. Date: Mar. 31, 2022

(65) Prior Publication Data
US 2023/0366372 A1   Nov. 16, 2023

(30) Foreign Application Priority Data
Sep. 24, 2020  (SE) .................................. 2051107-7

(51) Int. Cl.
*F03D 1/06* (2006.01)
*B32B 1/00* (2006.01)
(Continued)

(52) U.S. Cl.
CPC ............. *F03D 1/0675* (2013.01); *B32B 1/00* (2013.01); *B32B 7/12* (2013.01); *B32B 21/13* (2013.01);
(Continued)

(58) Field of Classification Search
CPC .... B32B 1/00; B32B 5/02; B32B 5/06; B32B 7/12; B32B 21/02; B32B 21/13;
(Continued)

(56) References Cited

U.S. PATENT DOCUMENTS 4,597,715 A * 7/1986 Coleman ................. F03D 1/065
416/229 R
5,474,425 A 12/1995 Lawlor
(Continued)

FOREIGN PATENT DOCUMENTS

WO   WO-2020/149784 A1   7/2020

OTHER PUBLICATIONS

International Search Report and Written Opinion, International Application No. PCT/SE2021/050931, dated Oct. 22, 2021.

*Primary Examiner* — Binh Q Tran
(74) *Attorney, Agent, or Firm* — MARSHALL, GERSTEIN & BORUN LLP (57) ABSTRACT

Rotor blade for a wind power plant. The rotor blade includes a plurality of curved laminated wooden modules attached to each other, where each curved laminated wooden module includes a plurality of laminated veneer lumber boards. Each curved laminated wooden module is curved in at least one direction, where each laminated veneer lumber board includes a first set of veneer plies, where the first set of veneer plies includes a plurality of veneer plies and where the wood grain is directed in a first direction, and a second set of veneer plies, where the second set of veneer plies includes a single veneer ply or several veneer plies arranged adjacent each other and where the direction of wood grain differs from the first direction. Beneficially, the rotor blade including curved laminated wooden modules can be obtained in an easy and cost-effective way. The rotor blade is further environmental friendly.

15 Claims, 5 Drawing Sheets (51) Int. Cl.
*B32B 5/02* (2006.01)
*B32B 5/06* (2006.01)
*B32B 7/12* (2006.01)
*B32B 21/02* (2006.01)
*B32B 21/13* (2006.01)
*B32B 21/14* (2006.01)

(52) U.S. Cl.
CPC ............... *B32B 21/14* (2013.01); *B32B 5/02* (2013.01); *B32B 5/06* (2013.01); *B32B 21/02* (2013.01); *B32B 2307/514* (2013.01); *B32B 2603/00* (2013.01); *F03D 1/0633* (2013.01); *F03D 1/0641* (2013.01); *F03D 1/0677* (2023.08); *F05B 2230/60* (2013.01); *F05B 2280/4002* (2013.01)

(58) Field of Classification Search
CPC .............. B32B 21/14; B32B 2307/514; B32B 2603/00; B32B 2605/18; F05B 2230/60; F05B 2280/4002
See application file for complete search history.

(56) References Cited

U.S. PATENT DOCUMENTS

| | | | |
|---|---|---|---|
| 2004/0253114 A1* | 12/2004 | Gunneskov | F03D 1/065 |
| | | | 416/224 |
| 2013/0164144 A1* | 6/2013 | Bendel | F03D 80/50 |
| | | | 29/889.7 |
| 2013/0224032 A1* | 8/2013 | Busbey | F03D 1/0633 |
| | | | 416/223 R |
| 2014/0119937 A1* | 5/2014 | Fang | B29C 70/56 |
| | | | 416/233 |
| 2018/0238300 A1* | 8/2018 | Shain | F03D 1/0675 |
| 2018/0298879 A1* | 10/2018 | Johnson | B29C 65/002 |
| 2019/0153993 A1* | 5/2019 | Tobin | B33Y 80/00 |
| 2019/0226447 A1 | 7/2019 | Stecher et al. | |
| 2019/0338750 A1* | 11/2019 | Bech | F03D 1/0675 |
| 2020/0025168 A1 | 1/2020 | Wernlund | |

* cited by examiner

ROTOR BLADE AND METHOD FOR ASSEMBLY OF A ROTOR BLADE

TECHNICAL FIELD

The present invention relates to a rotor blade for a wind power plant comprising a plurality of curved laminated wooden modules. Each curved laminated wooden module comprises a plurality of laminated veneer lumber boards, where each laminated veneer lumber board comprises a plurality of laminated veneer plies.

BACKGROUND ART

High towers are used for a number of different purposes. They may e.g. be used as transmitter masts or for wind power installations. A typical wind power installation is provided with a tower made of steel or concrete. The tower is attached to the ground by a foundation and the tower is provided with a nacelle at the top of the tower, holding the generator, the transmission and the rotor blades. The rotor blade is often made from laminated glass fibre and epoxy, sometimes with a mix of wooden veneer layers, and is often reinforced in different ways in order to create a sufficient stability of the blade.

These conventional rotor blades normally work well but they have some disadvantages. One disadvantage is that the laminated material may delaminate during use, due to the different bending forces that act on the blade. Another problem is the transport of rotor blades. Newer wind power plants use tall towers and long blades in order to increase the efficiency and power output of the wind power plant. Rotor blades longer than 50 meters or more are thus often used, which are difficult to transport. Due to efficiency, the wind power installations are often built in areas lacking roads, which complicate the transport of material to the site. A further disadvantage is that the used materials are petroleum based, and is thus not environmental friendly. Conventional worn out rotor blades can further not be recycled and can only be used as landfill.

Another disadvantage is the production of these rotor blades. The length of a rotor blade may be in the range between 20 to 50 meters or more, and is often produced in two parts, a front part and a rear part, that are mounted to each other. Each part is produced from a plurality of separate layers, where each single layer is placed in a dedicated mould and where all layers are pressed together with a high pressure and a high temperature. This is a very time and labour consuming process.

There is thus room for an improved rotor blade comprising a plurality of wooden modules.

SUMMARY OF THE INVENTION

An object of the invention is therefore to provide an improved rotor blade comprising a plurality of curved laminated wooden modules. A further object of the invention is to provide a method for the assembly of an improved rotor blade comprising a plurality of curved laminated wooden modules. A further object of the invention is to provide a wind power tower comprising an improved rotor blade.

The solution to the problem according to the invention is described in the characterizing part of claim 1 for the rotor blade, in claim 14 for the method of assembling a rotor blade and in claim 15 for the wind power tower. The other claims contain advantageous embodiments and further developments of the rotor blade.

In a rotor blade for a wind power plant comprising a plurality of curved laminated wooden modules attached to each other, where each curved laminated wooden module comprises a plurality of laminated veneer lumber boards, where each curved laminated wooden module is curved in at least one direction, the object of the invention is achieved in that each laminated veneer lumber board comprises a first set of veneer plies, where the first set of veneer plies comprises a plurality of plies and where the wood grain is directed in a first direction, and a second set of veneer plies, where the second set of veneer plies comprises a single veneer ply or several veneer plies arranged adjacent each other and where the direction of wood grain differs from the first direction.

By this first embodiment of a rotor blade, a wooden rotor blade comprising a plurality of curved laminated wooden modules is provided. By using a plurality of laminated veneer lumber boards comprising a plurality of laminated veneer plies, a rotor blade that will be able to withstand loads acting from any direction is provided. By using a plurality of veneer plies in each laminated veneer lumber board, a rotor blade that is lighter, stronger and more environmental friendly than comparable rotor blades made from composite plastics is provided. The rotor blade is assembled from a plurality of curved laminated wooden modules, where in one example a number of curved modules are assembled to an intermediate section, e.g. half a rotor blade, both an upper half and a lower half, and where the intermediate sections are thereafter mounted to each other to form a rotor blade. It is also possible to add reinforcements to the inner of the rotor blade before the two halves are mounted to each other.

One advantage of the invention is that the curved laminated wooden modules can be manufactured at a production plant, where a rational production of curved laminated wooden modules can be made under controlled environmental conditions. The curved laminated wooden modules can then be assembled to each other at the production plant or at a wind power erection site to a rotor blade. Depending on the required curvature of a curved laminated wooden module, a few curved laminated wooden modules may also be assembled to intermediate larger modules at the production plant, before they are mounted to each other to form the rotor blade. A further advantage of the invention is that rotor blades made from wood are environmental friendly, uses renewable materials and can easily be recycled when the lifetime is reached.

Each curved laminated wooden module is formed by laminating a plurality of laminated veneer lumber boards to each other. Each laminated veneer lumber board comprises a plurality of veneer plies or sheets. In the shown example, a type of a Laminated Veneer Lumber (LVL) board is used, which comprises a plurality of laminated veneer plies, where the fibre orientation of a first set of veneer plies are aligned in the same direction, i.e. with the wood grain of the plies arranged with the same fibre orientation. The LVL board will further comprise a second set of veneer plies comprising a single ply or several plies arranged adjacent each other arranged with the fibre orientation in a different direction. In one example, the fibre orientation is perpendicular, i.e. with the wood grain direction arranged 90 degrees to the wood grain orientation of the first set of plies. In this way, it will be possible to bend the LVL boards such that a curved laminated wooden module can be obtained. Since each board will only comprise a single position with one or more plies arranged in a crosswise direction, it will be possible to bend each board when they are being laminated to each other. In another example, the second set of veneer plies comprises two plies arranged adjacent each other with the fibre orientation of each ply directed perpendicular to each other, such that the wood grain direction of each ply of the second set of plies differs from the wood grain direction of the first set of plies by 45 degrees.

The second set of plies, i.e. the set of plies having a wood grain direction that differs from the first set of plies in a board, may be arranged at any position in the board, and may be arranged in the middle or close to one side of the board. In one example, the board comprises one or two veneer plies arranged in a first direction, a single ply arranged in a second direction perpendicular to the first direction, and several, e.g. 5 veneer plies, arranged in the first direction. The total number of veneer plies in a board may vary. A suitable number of veneer plies in a board may e.g. be in the range between 7 to 15 and may depend on the required thickness of a module and on the production process. A thinner board is easier to bend, but more separate boards have to be bent which takes more time. In another example, the LVL board is symmetric with a single veneer ply in the middle, with e.g. 4 veneer plies arranged on each side with the wood grain in a perpendicular direction.

It is also possible to integrate another fibre composite material in a board, such as a glass fibre or carbon fibre ply. Wood, and especially spruce, pine or birch, is a cheap and strong material suitable to be used for laminating boards from thin veneer plies. Other fibres may also be used, such as bamboo fibres, which may be laminated into boards with the fibres in a desired direction.

The mounting of the curved laminated wooden modules to each other may be made with a specific joint, which may comprise e.g. rabbets. Rabbets of a curved laminated wooden module will cooperate with rabbets of an adjacent curved laminated wooden module, where the curved laminated wooden modules may lock to each other. It is also possible to use overlapping joints, where one or more boards of a curved laminated wooden module overlap one or more boards of an adjacent curved laminated wooden module. Finger joints or puzzle joints are also possible to use when mounting curved laminated wooden modules to each other. The curved laminated wooden modules may be mounted to each other with glue and screws. The curved laminated wooden modules may also be mounted to each other by the use of mounting brackets. A mounting bracket may be arranged at the edge of a curved laminated wooden module, e.g. in the curved laminated wooden module, and may be adapted to extend into an adjacent curved laminated wooden module. The mounting brackets may be mounted by using screws and/or glue.

A further type of joint that may be used is to glue perforated steel plates into slits arranged in the curved laminated wooden modules. In this type of joint, steel plates are inserted into slits cut or routed in a curved laminated wooden module, where a slit preferably is slightly wider than a perforated steel plate. Each steel plate comprises a plurality of holes in a predefined pattern. Glue is injected into the slit such that half of a steel plate is glued to a curved laminated wooden module. An adjacent curved laminated wooden module is provided with corresponding slits such that two curved laminated wooden modules can be connected to each other in a reliable way by gluing the steel plates to the adjacent curved laminated wooden module. The number of steel plates used for a curved laminated wooden module is defined by calculation of the required forces that the joint must withstand.

In a curved laminated wooden module, several boards are laminated to each other to form the curved laminated wooden module. A curved laminated wooden module may e.g. comprise five laminated veneer lumber boards, where each LVL board may comprise e.g. seven veneer plies. In this example, the curved laminated wooden module will comprise a total of 35 veneer plies.

The boards are preferably pressed together in a press, where the curved laminated wooden module is further shaped to the required shape in the same pressing step. The curved laminated wooden module is e.g. formed by five boards. When a curved laminated wooden module has been pressed together and has cured, the rabbets or other joints and the side surfaces may thereafter be shaped by a precision router, such that relatively small tolerances are obtained. The small tolerances help to improve the stiffness and rigidity of the assembled sections and thus of the rotor blade. A curved laminated wooden module may comprise an odd or an even number of boards, where each board may comprises an odd or an even number of veneer plies.

When a curved laminated wooden module has been pressed together and is cured, it is also possible to remove some of the material of the module by e.g. a precision router. In one example, some material of the outer or inner surface may be removed in order to obtain a desired shape, e.g. a double curved outer surface. It is possible to remove some of the laminated wooden module in order to obtain e.g. a double curved shape or to optimize the weight of a laminated wooden module. It is also possible to add some additional material, e.g. of a lighter material, to the outer surface of a laminated wooden module and to remove some of this additional material in order to obtain a desired shape. The advantage of adding additional material to the outer surface is to preserve the load bearing properties of the wooden boards. In this way, the strength of the laminated wooden modules is preserved. Further, by adding an additional material of a lighter material that is also easier to machine, a desired shape such as a double curved shape is easily obtained. It is also possible to add some additional material to the inner side of a curved laminated wooden module, such as additional reinforcement on the inner surface.

A rotor blade may be divided in different sections comprising a number of curved laminated wooden modules, depending mainly on the required curvature of a curved laminated wooden module. It is preferred to use as few sections as possible for a rotor blade. A curved laminated wooden module may be up to thirty meters long. Rotor blades of different sizes may be constructed with the inventive method. However, the inventive method is mainly advantageous for rotor blades having a length of 20 meters and more.

The complete rotor blade may be made with only curved laminated wooden modules. In one example, the rotor blade comprises a front side that consists of two curved laminated wooden modules and a rear side that consists of two curved laminated wooden modules. It is also possible to provide the rotor blade with a section of a different material. In one example, the outer part of the rotor blade comprises a blade end section made from one or more curved laminated wooden modules comprising a different type of veneer plies, e.g. birch plies, and/or fiberglass laminated with epoxy.

BRIEF DESCRIPTION OF THE DRAWINGS

The invention will be described in greater detail in the following, with reference to the embodiments that are shown in the attached drawings, in which.

DETAILED DESCRIPTION OF THE DRAWINGS

The embodiments of the invention with further developments described in the following are to be regarded only as examples and are in no way to limit the scope of the protection provided by the patent claims.

Figure 1:
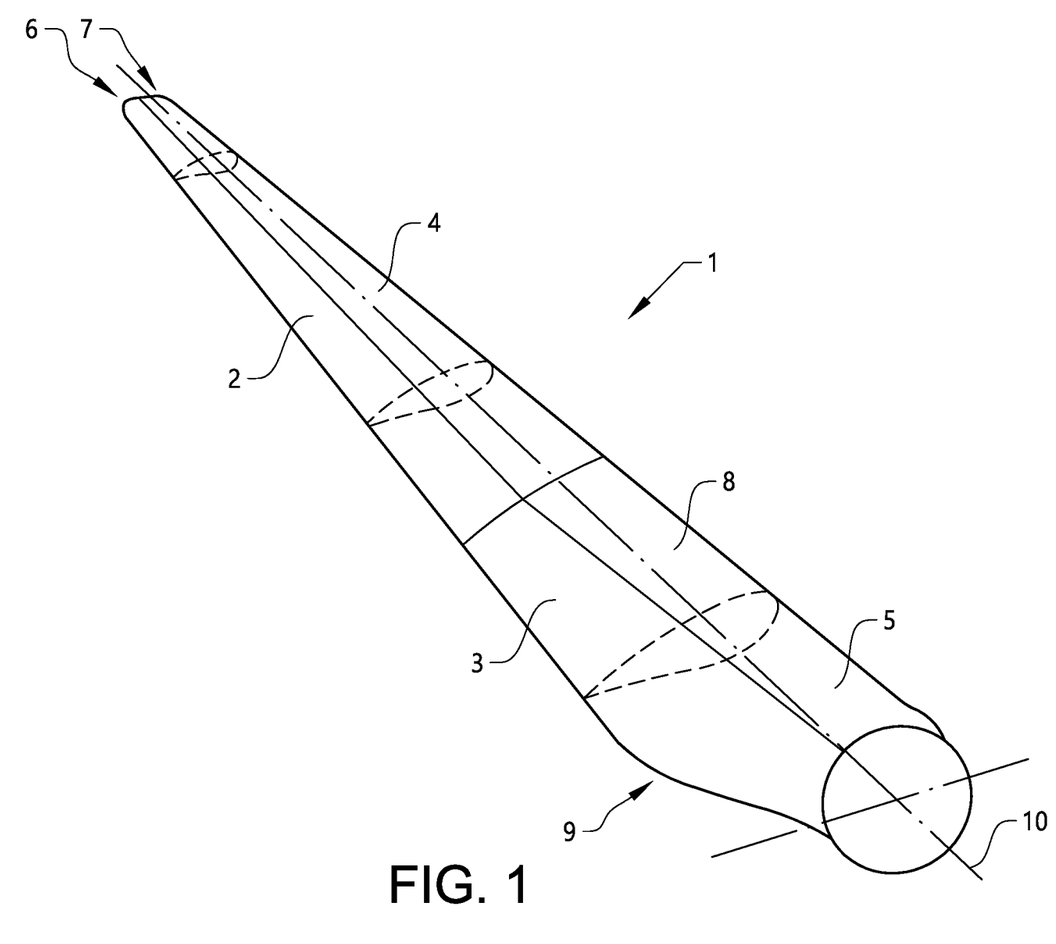
FIG. 1 shows an example of a rotor blade according to the invention.
Figure 2:
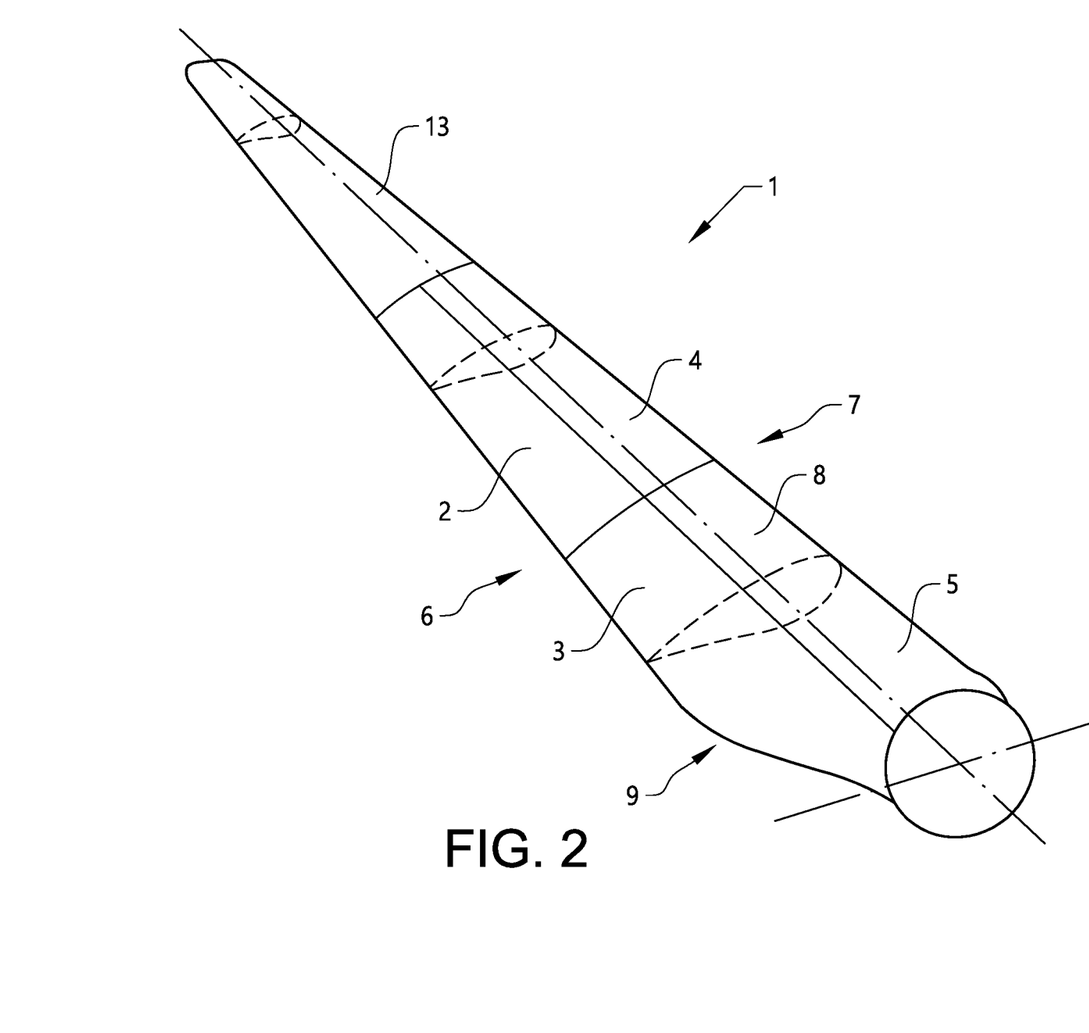
FIG. 2 shows a further example of a rotor blade according to the invention.
Figure 3:
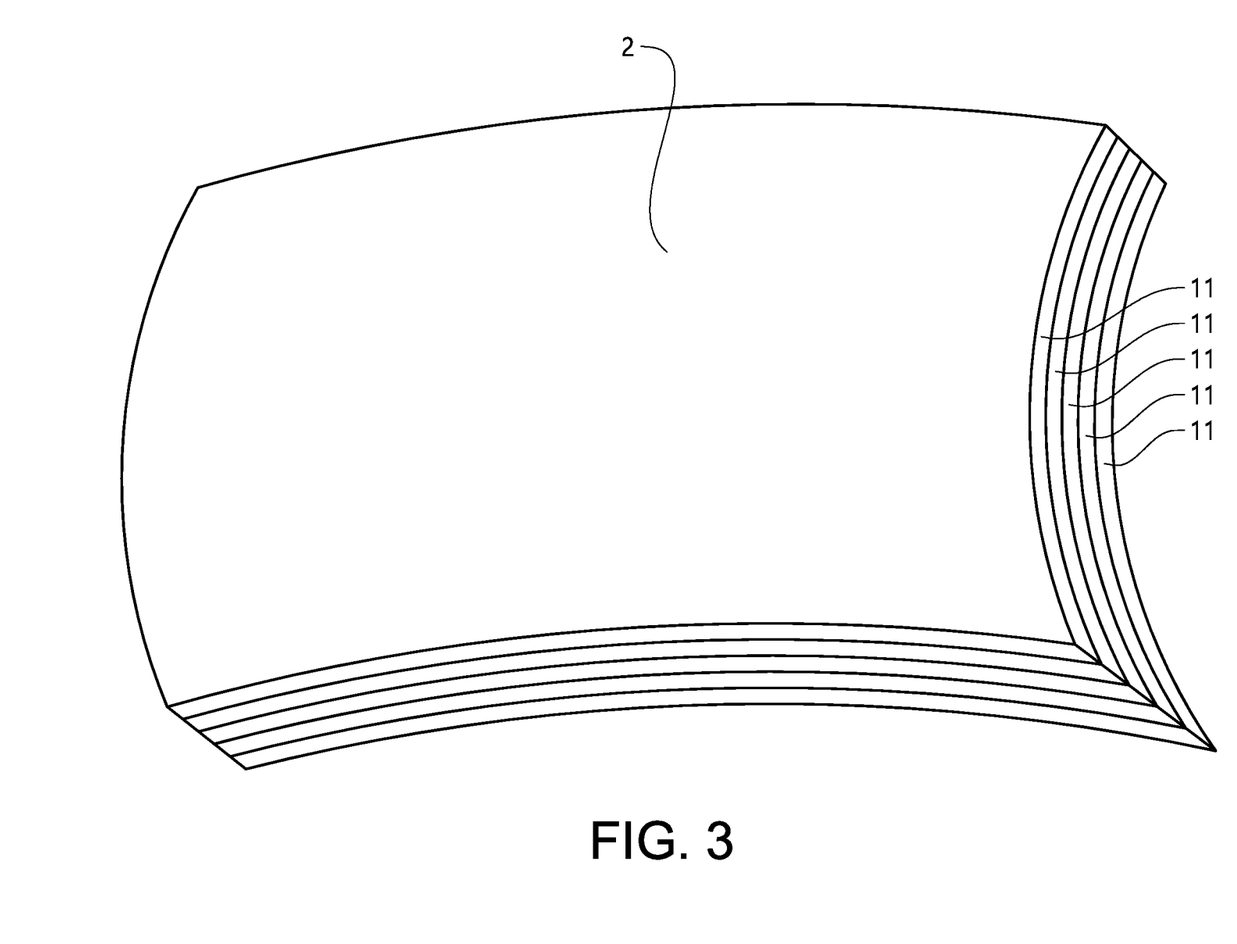
FIG. 3 shows an example of a curved laminated wooden module comprising a plurality of laminated layers for a rotor blade according to the invention.
Figure 4:
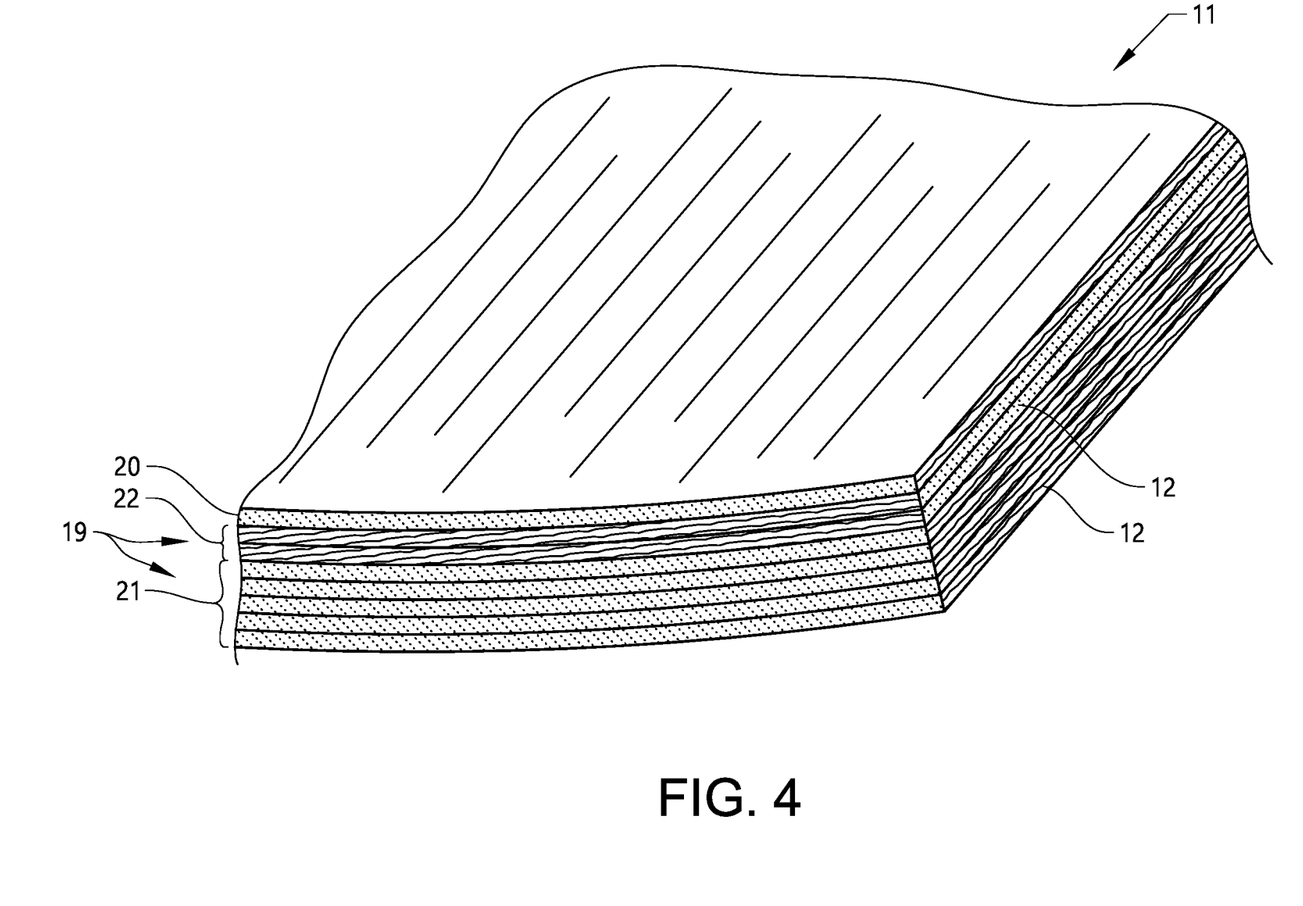
FIG. 4 shows an example of a laminated layer comprising a plurality of veneer plies.
Figure 5:
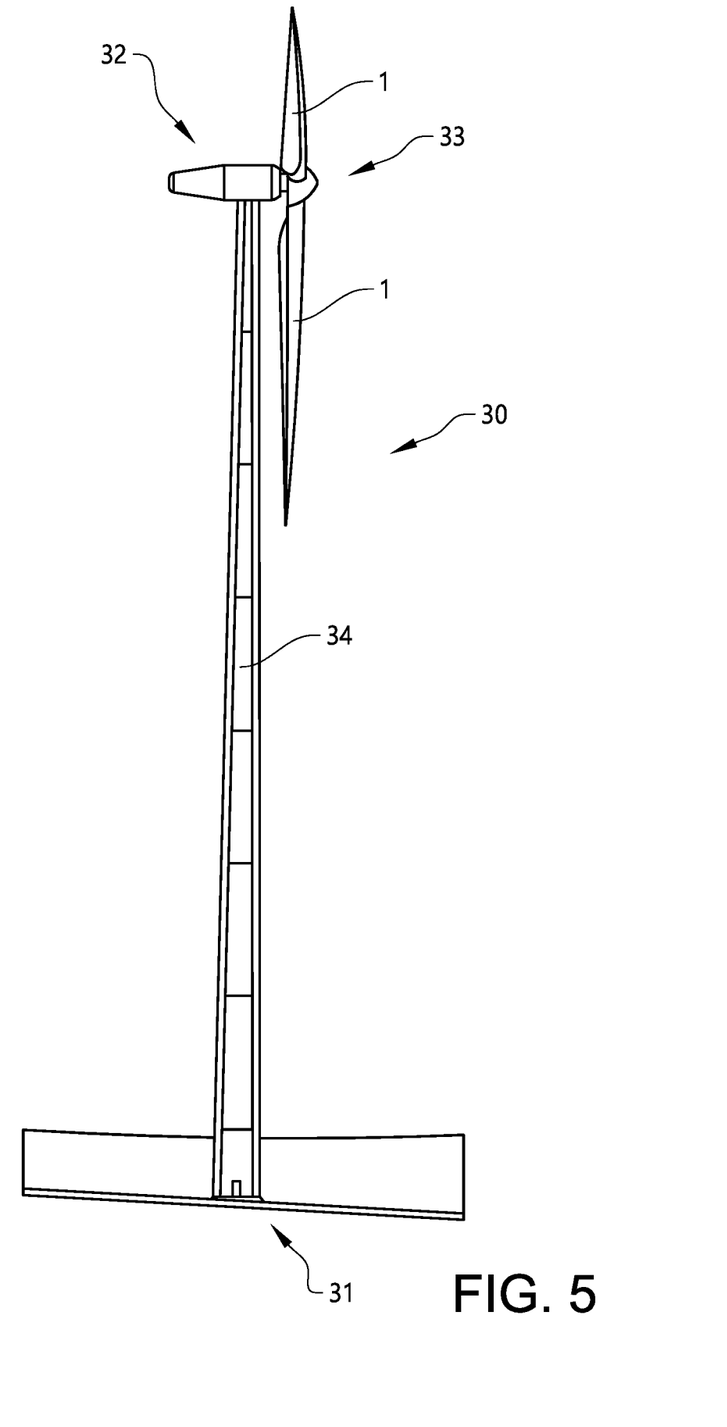
FIG. 5 shows an example of a wind power tower according to the invention.

FIGS. 1 and 2 show examples of a rotor blade comprising a plurality of curved laminated wooden modules, FIG. 3 shows an example of a module comprising a plurality of boards for a rotor blade, FIG. 4 shows an example of a laminated board used in a curved laminated wooden module, and FIG. 5 shows a wind power tower comprising a rotor blade.

A rotor blade 1 comprises a plurality of curved laminated wooden modules 2, 3, 4, 5. A curved laminated wooden module is curved in at least one direction, which may be in a longitudinal direction or in a sideway direction. Curved laminated wooden modules having different curvatures may be mounted to each other. In this way, complicated shapes, such as double-curved shapes, can be obtained for the rotor blade. The curved laminated wooden modules may be mounted to each other one by one in order to form the rotor blade, or the curved laminated wooden modules may be mounted to each other to form intermediate sections 6, 7, where each intermediate section comprises a plurality of curved modules 2, 3, 4, 5. The intermediate sections are then mounted to each other to form the rotor blade. The rotor blade 1 is provided with a rotational centre axis 10.

In the example shown in FIG. 1, the front side 8 of the rotor blade 1 comprises four curved laminated wooden modules, a first curved laminated wooden module 2, a second curved laminated wooden module 3, a third curved laminated wooden module 4 and a fourth curved laminated wooden module 5. The first curved laminated wooden module 2 and the second curved laminated wooden module 3 are assembled to a first longitudinal intermediate section 6 and the third curved laminated wooden module 4 and the fourth curved laminated wooden module 5 are assembled to a second longitudinal intermediate section 7.

The front side 8 of a rotor blade may have a relatively simple curvature and may e.g. be continuously convex. The front side of the rotor blade is the side directed to the incoming wind, and the rear side is the trailing side of the rotor blade. The rear side 9 may be more complicated and may be both convex and concave, and the shape may further vary in the longitudinal direction of the rotor blade. For this reason, it may be of advantage to divide the front part in e.g. two longitudinal intermediate sections 6, 7, each comprising two curved laminated wooden modules as shown in FIG. 1. The rear side 9 may e.g. be divided in three or more longitudinal intermediate sections, each comprising two curved laminated wooden modules (not shown).

In order to optimize the shape of the rotor blade, it is also possible to remove some of the material of a curved module by e.g. a precision router. In one example, some material of the outer surface may be removed in order to obtain a desired shape, e.g. a double curved outer surface. It is possible to remove part of some of the material of a laminated wooden module to obtain the desired shape. It is also possible to add some additional material, e.g. of a lighter and/or softer material to the outer surface of a laminated wooden module and to remove some of this additional material in order to obtain a desired shape. The advantage of adding additional material to the outer surface is to preserve the load bearing properties of the wooden boards of the curved laminated wooden module. In this way, the strength of the laminated wooden modules is preserved. Further, by adding an additional material of a lighter material that is also easier to machine, a desired shape such as a double curved shape is easily obtained. It is also possible to add additional material with the desired shape such that additional machining is not necessary. It is also possible to add some additional material to the inner side of a curved laminated wooden module, such as additional reinforcement on the inner surface.

In the example shown in FIG. 1, the complete rotor blade 1 comprises only curved laminated wooden modules. These curved laminated wooden modules are all made from the same type or different types of laminated veneer lumber (LVL) boards made e.g. from spruce or pine. This is a strong and cheap material well suited for curved laminated wooden modules. Depending on the requirements, it is also possible to use other wooden veneer materials for the curved laminated wooden modules, e.g. LVL boards made from birch veneer plies may be used when the demands are higher.

FIG. 2 shows another example of a rotor blade 1. In this example, the front side 8 of the rotor blade 1 also comprises four curved laminated wooden modules, a first curved laminated wooden module 2, a second curved laminated wooden module 3, a third curved laminated wooden module 4 and a fourth curved laminated wooden module 5. The first curved laminated wooden module 2 and the second curved laminated wooden module 3 are assembled to a first longitudinal intermediate section 6 and the third curved laminated wooden module 4 and the fourth curved laminated wooden module 5 are assembled to a second longitudinal intermediate section 7.

The rotor blade further comprises a blade end section 13 arranged at the outer end of the rotor blade, constituting the tip of the rotor blade. The length of the blade end section may e.g. be 20-35% of the total length of the rotor blade. The blade end section may be made from a different material than the curved laminated wooden modules used for the rest of the rotor blade, and may consist of one or more curved laminated wooden modules. In one example, the blade end section is made from one or more curved laminated wooden modules comprising a different type of veneer plies, e.g. birch plies. The blade end section may also be made from fiberglass laminated with epoxy, as in conventional rotor blades, or from wooden veneer plies laminated with carbon fibres and epoxy. The exact shape of the end section may also be machined to the desired shape from one or more curved laminated wooden modules.

One advantage of using curved laminated wooden modules made from LVL boards comprising a plurality of veneer plies is that it is a cheap and relatively strong material. For parts of the rotor blade, where high load and/or low weight is very important, it may be advantageous to use another material or to use a combination of different materials. The forces and loads acting on the outer end of a rotor blade is extremely high and it may for this reason be of advantage to use a material of a higher quality. One such material may be laminated LVL boards of birch comprising a plurality of thin veneer plies, having a thickness of e.g. 0.2 to 1 mm. Higher quality laminated layers are more expensive but provide a higher weight-load bearing ratio. Fibreglass or carbon fibres laminated with e.g. epoxy may also be used.

It is also possible to use different curved laminated wooden modules in different places of the rotor blade. In one example, the inner part of the rotor blade, e.g. the curved laminated wooden modules 3 and 5, may comprise six LVL boards, the intermediate curved laminated wooden modules 2 and 4 may comprise five LVL boards, and the blade end section 13 may comprise five LVL boards of a higher quality.

The mounting of the curved laminated wooden modules to each other may be made with a specific joint, which could comprise e.g. rabbets of a curved laminated wooden module that cooperates with rabbets of an adjacent curved laminated wooden module, where the curved laminated wooden modules may lock to each other. It is also possible to use overlapping joints, where one or more boards of a curved laminated wooden module overlap one or more boards of an adjacent curved laminated wooden module. Finger joints or puzzle joints are also possible to use when mounting curved laminated wooden modules to each other. The curved laminated wooden modules may be mounted to each other with glue and screws.

The intermediate sections may be mounted to each other by the use of perforated steel plates that are glued in slits provided in the intermediate sections. A steel plate is arranged in a slit in an edge of an intermediate section and is adapted to extend into a slit in an adjacent intermediate section, where the perforated steel plate is adhered to the intermediate section by the use of a specific glue. Several steel plates may be used for each intermediate section. It would also be possible to use such a joint to attach curved laminated wooden modules to each other.

A curved laminated wooden module comprises a plurality of laminated boards 11. In one example, shown in FIG. 3, the curved laminated wooden module comprises five LVL boards. The boards are press glued to each other such that a solid curved laminated wooden module is obtained. A curved laminated wooden module is provided with an upper edge, a lower edge, a first side edge, a second side edge, an inner surface and an outer surface. A board 11 comprises several laminated veneer plies 12. In an LVL board, the direction of the wood fibres of the veneer plies of a first set of veneer plies 19 are directed in the same direction. The first set of veneer plies contain most of the plies, and preferably at least 80% of the number of veneer plies. An LVL board further comprises a second set of veneer plies 22 comprising a single ply or two/several plies arranged adjacent each other with the direction of the wood fibres directed in a different direction when compared to the first set of veneer plies. In one example, the direction of the wood fibres of the second set of veneer plies are perpendicular to the direction of the wood fibres of the first set of veneer plies. Preferably, the second set of veneer plies comprise one or two plies, but may comprise more veneer plies arranged adjacent each other, or may comprise a thicker veneer ply.

The second set of veneer plies, i.e. the set of veneer plies having a wood grain direction that differs from the first set of veneer plies of a board, may be arranged at any position of the board. In one example, the second set of veneer plies is arranged as an outermost set of veneer plies of a board, i.e. the second set of veneer plies will constitute the inner surface or the outer surface of a board. In another example, the second set of veneer plies is arranged within the first set of veneer plies. A first part 20 of the first set of veneer plies 19 is in this case arranged on one side of the second set of veneer plies 22, and a second part 21 of the first set of veneer plies 19 is arranged on the other side of the second set of veneer plies 22. In one example, the LVL board is symmetric with the second set of veneer plies 22 comprising a single veneer ply arranged in the middle of the LVL board, where the first part 20 and the second part 21 of the first set of veneer plies 19 each comprising e.g. three or four veneer plies arranged on each side of the second set of veneer plies 22, with the wood grain in a perpendicular direction.

In another example, the second set of veneer plies comprises two plies arranged adjacent each other with the fibre orientation of each ply directed perpendicular to each other, such that the wood grain direction of each ply of the second set of plies differs from the wood grain direction of the first set of plies by 45 degrees.

In one example, shown in FIG. 4, the LVL board 11 comprises eight veneer plies 12. The first part 20 of the first set of veneer plies 19 comprises a single veneer ply arranged in the first direction, the second set of veneer plies 22 comprises two veneer plies arranged adjacent each other in the second direction perpendicular to the first direction, and the second part 21 of the first set of veneer plies 19 comprises five veneer plies arranged in the first direction. The number of veneer plies in a board may vary. A suitable number of veneer plies in a board may e.g. be in the range between 7 to 15 and may depend on the required thickness of a module and on the production process. It is important that there is only one second set of plies. If two or three veneer plies are used for the second set of the crosswise veneer plies, they must be arranged adjacent each other. Using a single set of veneer plies arranged in a cross manner will strengthen the board and will still allow the board to be bent to a curved shape. A regular plywood board having at least two plies arranged crosswise and which are spaced apart from each other will not be possible to bend without breaking the board. In a complete curved laminated wooden module, there will thus be a number of cross-directed veneer plies spaced apart, which will increase the load bearing properties of a curved laminated wooden module.

In another example, the second set of veneer plies may be arranged as an outermost set of veneer plies of a board, i.e. the second set 22 of veneer plies will constitute an inner surface or an outer surface of a board. All veneer plies of the first set of veneer plies 19 are here arranged adjacent each other, with the first part 20 of the first set of veneer plies 19 and the second part 21 of the first set of veneer plies 19 arranged adjacent each other.

It is also possible to let the first part of the first set of veneer plies comprise other number of plies. For a board comprising eight veneer plies, the first part may comprise one, two or three veneer plies, with the second set of plies comprising two veneer plies. For a board comprising seven plies, the first part may comprise one, two or three veneer plies, with the second set of plies comprising a single ply.

The boards are pressed together in a glue press, where the final shape of the curved laminated wooden module is obtained. In the press, the boards are pressed with a high pressure, and at room temperature. The glue is in one example a slow curing glue that cures over several hours at room temperature. The press pressure is applied during the complete curing time for the curved module. One advantage of not using a high temperature during the pressing is that there will be no temperature gradients in the wooden module that has to be considered. When using a high temperature, it must be ensured that the complete wooden module is heated to a desired temperature.

When a curved laminated wooden module has been glued together, the edges of the curved laminated wooden module are thereafter shaped to the desired shape, in one example to plane surfaces, by a precision router, such that relatively small tolerances are obtained. Other shapes such as rabbets or other joints are conceivable. The small tolerances help to improve the stiffness and rigidity of assembled curved laminated wooden modules or sections and thus of the rotor blade. By precision routing the joint surfaces, the end surfaces of each layer can also be used to strengthen the joint. The surface of a curved laminated wooden layer may also be shaped with the router.

There are several advantages of using LVL boards to laminate curved modules instead of using a plurality of independent veneer layers. One advantage is that when a board is laminated from independent veneer layers, e.g. when producing LVL boards or plywood boards, both heat and pressure is required. Further, due to the heat transfer through wood, the maximum thickness of a board is restricted. The handling of boards are much simpler than the handling of separate veneer plies, especially since the wood grain of some veneer plies should be directed in another direction. This is especially the case when large curved wooden modules are to be produced, where the width is e.g. in the range of 1-2 meters and the length is between e.g. 10-20 meters.

A curved laminated wooden module may also be provided with different kinds of joints. The side edges may e.g. be provided with a tongue or a groove, such that a tongue and groove joint is obtained between two adjacent curved laminated wooden modules. It is e.g. possible to provide the side edges with a double or stepped rabbet, such that a rabbet is provided with two rabbet edges provided at different heights, and two rabbet bottoms provided at different widths.

A wooden LVL board is made from several veneer plies of thin wood. A veneer ply may be e.g. 2 mm thick, and with nine veneer plies a 18 mm thick board is obtained. By using eight boards, a curved laminated wooden module being 144 mm thick is obtained. The number of used boards and the number of plies in a board depends on the forces that the final construction must handle. A veneer ply is preferably between 2 to 4 mm thick.

The curved laminated wooden modules are preferably mounted to each other to form the rotor blade at the erection site for the wind power tower. This will ensure a high precision of the mounting process and will provide a reliable result. It is further possible to treat the surface of the rotor blade with an appropriate surface protection, and e.g. integrate a lightning arrester cable, a metallic wiring that can provide an uninterrupted path to the ground. The curved laminated wooden modules may be mounted to each other, or may first be assembled to intermediate sections that are thereafter mounted to each other. In this way, a complete rotor blade can be assembled at an erection site.

FIG. 5 shows an example of a wind power tower 30. The wind power tower may comprise a laminated wood tower 34 or a regular tower made from steel or concrete. The shown wind power tower may be up to 100 meters and more, and is in the shown example tapered somewhat towards the top of the tower. The tower is fixed to a foundation 31, e.g. comprising steel bars extending up in the tower, to which the lower wooden section is attached with e.g. screws. On top of the tower, a nacelle 32 with a generator and a rotor 33 comprising three rotor blades 1 is provided. Depending on the type of generator used, a transmission may also be installed.

The invention is not to be regarded as being limited to the embodiments described above, a number of additional variants and modifications being possible within the scope of the subsequent patent claims.

The invention claimed is:

1. A rotor blade for a wind power plant, comprising:
a plurality of curved laminated wooden modules attached to each other, where each curved laminated wooden module comprises a plurality of laminated veneer lumber boards, where each curved laminated wooden module is curved in at least one direction
wherein each laminated veneer lumber board comprises a first set of veneer plies, where the first set of veneer plies comprises a plurality of veneer plies and where the wood grain is directed in a first direction, and a second set of veneer plies, where the second set of veneer plies comprises a single ply or several veneer plies arranged adjacent each other and where the direction of wood grain differs from the first direction.

2. The rotor blade according to claim 1, wherein the second set of veneer plies is arranged as an outermost set of veneer plies on each laminated veneer lumber board, and that all veneer plies of the first set of veneer plies are arranged adjacent each other.

3. The rotor blade according to claim 1, wherein the second set of veneer plies is arranged embedded inside the first set of veneer plies, such that a first part of the first set of veneer plies is arranged on one side of the second set of veneer plies, and a second part of the first set of veneer plies is arranged on the other side of the second set of veneer plies.

4. The rotor blade according to claim 3, wherein the first part and the second part of the first set of veneer plies comprise the same number of veneer plies.

5. The rotor blade according to claim 1, wherein a curved laminated wooden module is elongated and curved in a longitudinal direction.

6. The rotor blade according to claim 1, wherein a curved laminated wooden module is elongated in a longitudinal direction and curved in a width direction.

7. The rotor blade according to claim 1, wherein the direction of wood grain of the second set of veneer plies is perpendicular to the first direction.

8. The rotor blade according to claim 1, wherein the second set of veneer plies comprises two veneer plies arranged with the wood grain direction of each veneer ply perpendicular to each other, and where the wood grain direction of each veneer ply differs from the first direction by 45 degrees.

9. The rotor blade according to claim 1, wherein the front side and the rear side of the rotor blade each comprises at least two curved laminated wooden modules.

10. The rotor blade according to claim 1, wherein the rotor blade further comprises additional material glued to at least one laminated wooden module.

11. The rotor blade according to claim 9, wherein the additional material is of a different material than the laminated wooden module and that it is glued to the outside of a laminated wooden module.

12. The rotor blade according to claim 10, wherein part of the additional material is routed away in order to provide a double curved shape of the laminated wooden module.

13. The rotor blade according to claim 1, wherein the rotor blade further comprises a blade end section made from a different material.

14. A method for assembling a rotor blade according to claim 1, where the method comprises the steps of:

attaching a plurality of curved laminated wooden modules fixedly to each other to form an intermediate section, repeating the step of attaching a plurality of curved laminated wooden modules fixedly to each other to form an intermediate section until all required intermediate sections are produced, and attaching the intermediate sections fixedly to each other until all intermediate sections are attached to each other to form the rotor blade.

15. A power tower, comprising:

a tower, a nacelle, and a rotor, wherein the rotor comprises a plurality of rotor blades according to claim 1.

\* \* \* \* \*

UNITED STATES PATENT AND TRADEMARK OFFICE
CERTIFICATE OF CORRECTION

| | | |
|---|---|---|
| PATENT NO. | : 11,920,558 B2 | Page 1 of 1 |
| APPLICATION NO. | : 18/027877 | |
| DATED | : March 5, 2024 | |
| INVENTOR(S) | : Geir Söderin et al. | |

It is certified that error appears in the above-identified patent and that said Letters Patent is hereby corrected as shown below:

On the Title Page

In Column 1, item (72), under "Inventors", Line 4, Geir Söderin, City of Residence, "Gothenburg" should be -- Göteborg --.

In Column 1, item (72), under "Inventors", Line 5, David Olivegren, City of Residence, "Gothenburg" should be -- Göteborg --.

In Column 1, item (72), under "Inventors", Line 6, Erik Dölerud, City of Residence, "Gothenburg" should be -- Göteborg --.

Signed and Sealed this
Fourth Day of June, 2024

Katherine Kelly Vidal
*Director of the United States Patent and Trademark Office*